United States Patent
Elliott

[11] Patent Number: 6,065,970
[45] Date of Patent: May 23, 2000

[54] METHOD OF PLAYING AN EDUCATIONAL MATHEMATICAL GAME

[76] Inventor: Karen Crawford Elliott, 426 Greenacres Dr., Crawfordsville, Ind. 47933

[21] Appl. No.: 09/290,426

[22] Filed: Apr. 13, 1999

[51] Int. Cl.[7] .............................. G09B 19/22; G09B 1/00
[52] U.S. Cl. ........................ 434/209; 434/128; 434/188; 273/302
[58] Field of Search ..................... 434/193, 188, 434/200, 209, 204, 205; 273/271, 292, 267, 299, 302

[56] References Cited

U.S. PATENT DOCUMENTS

| | | |
|---|---|---|
| 1,073,786 | 9/1913 | Thomas . |
| 1,558,690 | 10/1925 | McCollom .............................. 273/271 |
| 1,615,077 | 1/1927 | Gouldin . |
| 1,843,183 | 2/1932 | Thompson ............................ 434/345 |
| 1,871,247 | 8/1932 | Trost . |
| 3,357,116 | 12/1967 | Bazacos .................................. 434/193 |
| 3,649,024 | 3/1972 | Katzman . |
| 3,841,628 | 10/1974 | Goldfarb . |
| 4,036,492 | 7/1977 | Breslow . |
| 4,188,734 | 2/1980 | Rich ..................................... 434/200 |
| 4,379,700 | 4/1983 | Pollock ................................. 434/208 |
| 5,066,234 | 11/1991 | LeDesma .............................. 434/205 |
| 5,074,794 | 12/1991 | Von Hagen ............................ 434/193 |
| 5,167,505 | 12/1992 | Walsh .................................... 434/205 |
| 5,722,834 | 3/1998 | Rivera et al. . |

Primary Examiner—Kien T. Nguyen
Assistant Examiner—K. Fernstrom
Attorney, Agent, or Firm—Maginot, Addison & Moore

[57] ABSTRACT

A method of playing a game which includes (i) a game board which is divided into a plurality of sections such that each of the sections defines a playing location, (ii) a number disposed on each of the playing locations, (iii) a plurality of cards, and (iv) a number disposed on each of the cards is disclosed. The game includes the steps of (a) providing a game player with a multiplicity of the cards, (b) the game player determining if the number indicated on any one of the cards is a first mathematical multiple of the number indicated on any one of the playing locations, (d) removing from the multiplicity of the cards a first card that has the number indicated thereon which is the first mathematical multiple of the number indicated on one of the playing locations, and (e) positioning the first card on one of the playing locations such that the number indicated on the first card is the first mathematical multiple of the number indicated on the playing location on which the first card is positioned.

16 Claims, 4 Drawing Sheets

METHOD OF PLAYING AN EDUCATIONAL MATHEMATICAL GAME

BACKGROUND OF THE INVENTION

The present invention generally relates to educational games. The present invention particularly relates to a method of playing an educational mathematical game.

It is important for children to learn and acquire various basic skills during their early education since these basic skills are relied upon to further advance the child's intellectual capabilities. For example, it is extremely important that children acquire basic math skills. Specifically, basic mathematical skills serve multiple purposes, including preparation for work, for citizenship, for general education, and for higher education.

One math skill a child must learn are the division and multiplication tables. Heretofore, children have learned the division and multiplication tables by utilizing teaching aids such as flash cards. A problem with utilizing the aforementioned teaching aid to learn the division and multiplication tables is that the flash cards depend upon repetition and rote memory to teach the subject matter to the child. As a result, the use of flash cards is not sufficiently entertaining to keep a child's interest. This lack of interest decreases the educational value of teaching aids such as flash cards and can contribute to the child losing interest in mathematics. An additional problem with such teaching aids is that the teaching aid is not designed to accommodate different mathematical proficiency levels in children. For example, the same set of flash cards do not lend themselves to teaching a relatively advanced child and a child which is not as advanced.

Therefore it is desirable to have a method of playing an educational mathematical game which overcomes one or more of the problems set forth above.

SUMMARY OF THE INVENTION

In accordance with one embodiment of the present invention, there is provided a method of playing a game with a number of players. The game includes the steps of (a) providing a game playing area which has (i) a plurality of playing locations thereon and (ii) a number indicated on each of the playing locations, (b) providing a plurality of playing elements, each playing element having a number indicated thereon, (c) determining if the number indicated on any one of the plurality of the playing elements is a first mathematical multiple of the number indicated on any one of the playing locations, (d) removing from the plurality of playing elements a first playing element that has the number indicated thereon which is the first mathematical multiple of the number indicated on one of the playing locations, and (e) positioning the first playing element on one of the playing locations such that the number indicated on the first playing element is the first mathematical multiple of the number indicated on the playing location on which the first playing element is positioned.

Pursuant to another embodiment of the present invention, there is provided a method of playing a game with a number of players. The game includes the steps of (a) providing a game playing area which has (i) a plurality of playing locations thereon and (ii) a number indicated on each of the playing locations, (b) providing a plurality of playing elements, each playing element having a number indicated thereon, (c) determining if the number indicated on any one of the plurality of the playing elements is a first mathematical quotient of the number indicated on any one of the playing locations, (d) removing from the plurality of playing elements a first playing element that has the number indicated thereon which is the first mathematical quotient of the number indicated on one of the playing locations, and (e) positioning the first playing element on one of the playing locations such that the number indicated on the first playing element is the first mathematical quotient of the number indicated on the playing location on which the first playing element is positioned.

According to yet another embodiment of the present invention, there is provided a method of playing a game which includes (i) a game board which is divided into a plurality of sections such that each of the sections defines a playing location, (ii) a number disposed on each of the playing locations, (iii) a plurality of cards, and (iv) a number disposed on each of the cards. The game includes the steps of (a) providing a game player with a multiplicity of the cards, (b) the game player determining if the number indicated on any one of the cards is a first mathematical multiple of the number indicated on any one of the playing locations, (d) removing from the multiplicity of the cards a first card that has the number indicated thereon which is the first mathematical multiple of the number indicated on one of the playing locations, and (e) positioning the first card on one of the playing locations such that the number indicated on the first card is the first mathematical multiple of the number indicated on the playing location on which the first card is positioned.

It is therefore an object of the present invention to provide a new and useful method of playing a game.

It is another object of the present invention to provide an improved method of playing a game.

It is still another object of the present invention to provide a method of playing an educational mathematical game which is fun and entertaining to a child.

It is yet another object of the present invention to provide a method of playing an educational mathematical game which introduces a competitive element into learning basic mathematical skills.

It is yet another object of the present invention to provide a method of playing an educational mathematical game which can be utilized to teach mathematical skills to relatively advanced children and children which are not as advanced.

The above and other objects, features, and advantages of the present invention will become apparent from the following description and attached drawings.

DETAILED DESCRIPTION OF THE PREFERRED EMBODIMENT

Figure 1:
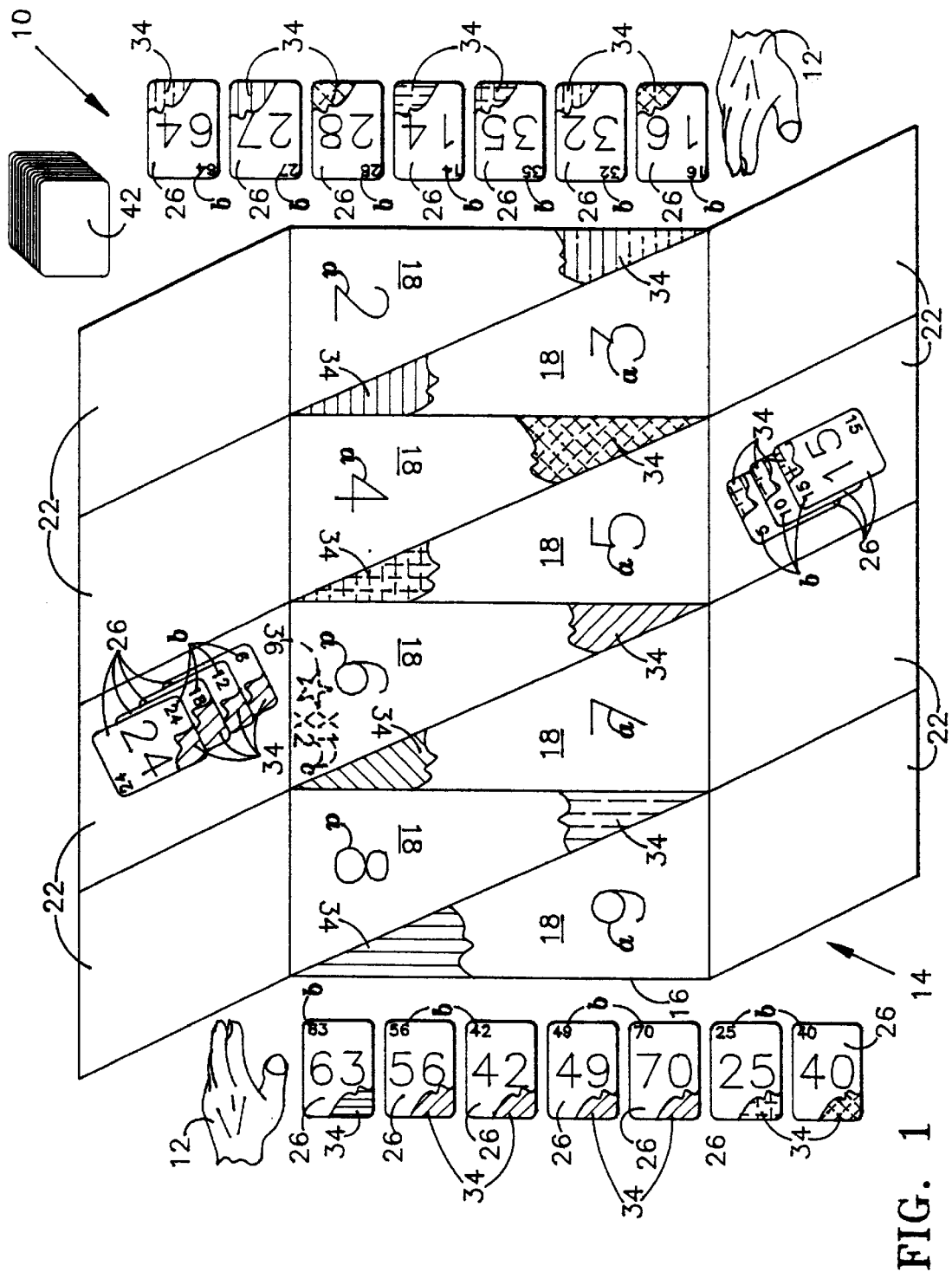
FIG. 1 is a top elevational view of a first embodiment of a game which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
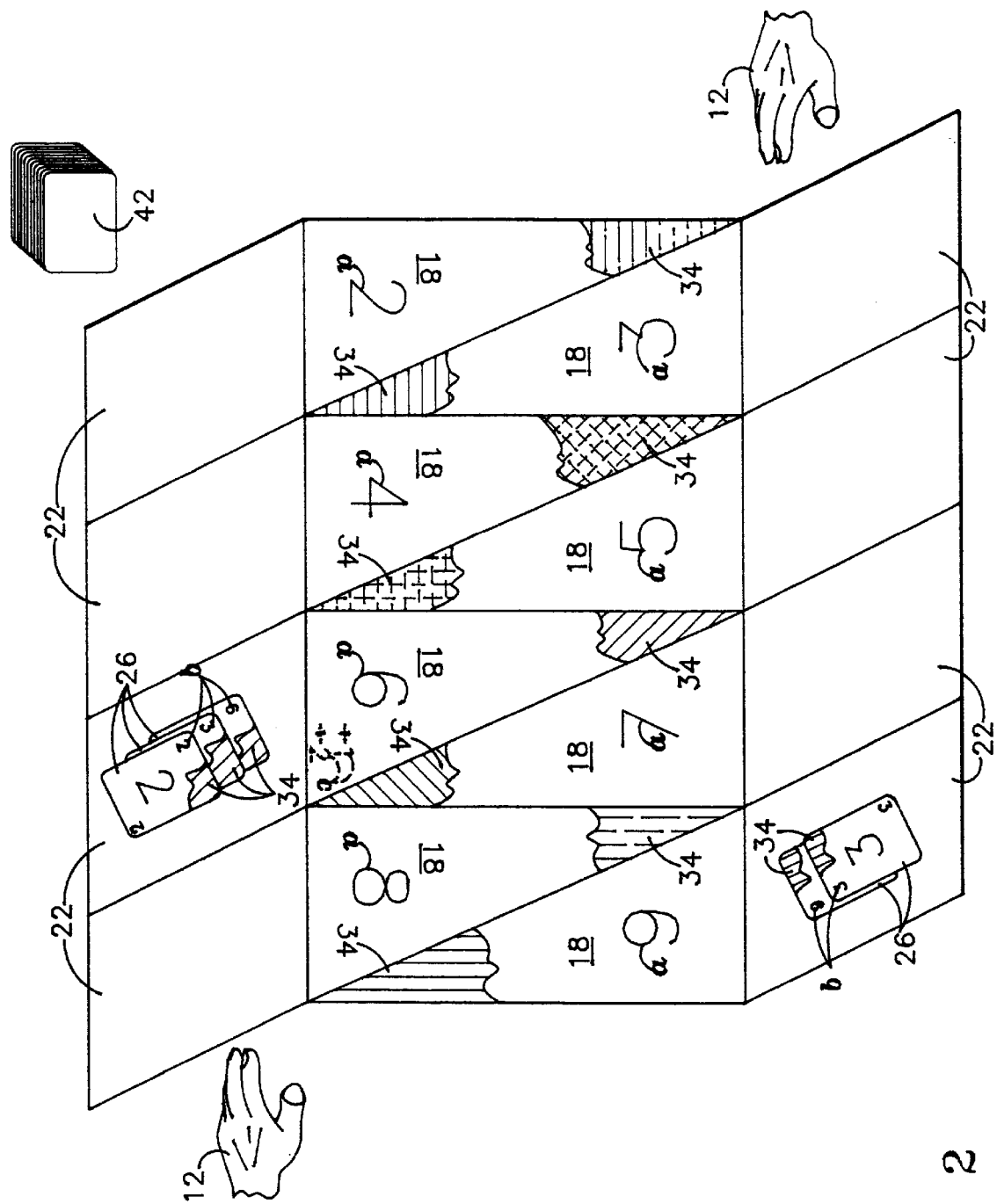
FIG. 2 is a top elevational view of a second embodiment of the game shown in FIG. 1 which incorporates the features of the present invention therein.

Referring now to FIGS. 1, 3, 4, and 5, there is shown a game 10 which incorporates the features of the present invention therein. Game 10 is played by a number of players 12 (note that only one hand of each player 12 is shown in FIGS. 1 and 2 for clarity of description). The game 10 includes a game board 16 and a plurality of playing elements, such as cards 26. In particular, game 10 includes three decks of cards, i.e. a first deck of cards, a second deck of cards, and a third deck of cards. Note that only the first deck of cards is shown in FIGS. 1 and 2 for clarity of description.

Game board 16 defines a game playing area 14. Game playing area 14 is divided into a number of sections 18. Note that each section 18 includes a triangular shaped portion and a parallelogram shaped portion. It should be appreciated that each section 18 includes both the triangular shaped portion and the parallelogram. Each section 18 defines a playing location 22. In addition, game board 16 includes a plurality of numbers a disposed thereon. In particular, each playing location 22 has a different number a disposed thereon. For example, as shown in FIG. 1, one playing location 22 has the number "6" disposed thereon, while another playing location has the number "5" disposed thereon. It should be appreciated that while game board 16 is shown having the numbers "2" through "9" disposed thereon, any sequence of numbers a can be disposed on the playing locations 22, for example the number "40" through "47" can be disposed on the playing locations 22. Furthermore, the numbers on playing locations 22 do not have to be in sequence, they can be randomly selected and disposed on the playing locations 22.

Moreover, it should be understood that each playing location 22 has a different indicia disposed thereon. For example, as shown in FIG. 1, each playing location 22 has a different color 34 indicia disposed thereon. Note that only a portion of each playing location 22 is shown having a color 35 disposed thereon for clarity of description. Specifically, the playing location 22 having the number "2" disposed thereon has the color 34 gray disposed thereon, the playing location 22 having the number "3" disposed thereon has the color blue disposed thereon, the playing location 22 having the number "4" disposed thereon has the color orange disposed thereon, the playing location 22 having the number "5" disposed thereon has the color gold disposed thereon, the playing location 22 having the number "6" disposed thereon has the color green disposed thereon, the playing location 22 having the number "7" disposed thereon has the color brown disposed thereon, the playing location 22 having the number "8" disposed thereon has the color purple disposed thereon, the playing location 22 having the number "9" disposed thereon has the color red disposed thereon. However, indicia other than color can also be utilized. For example, as shown in FIG. 1, a design such as an outline of a star 36 can be utilized on the playing location 22 which has the number "6" disposed thereon. It should be understood that these designs are used as the indicia instead of a color 34. If designs are used, then each playing location 22 would have a different design disposed thereon. For example, if the playing location 22 which has the number "6" disposed thereon has an outline of a star 36 disposed thereon, then the playing location 22 which has the number "4" disposed thereon could have an outline of a half moon disposed thereon.

Figure 4:
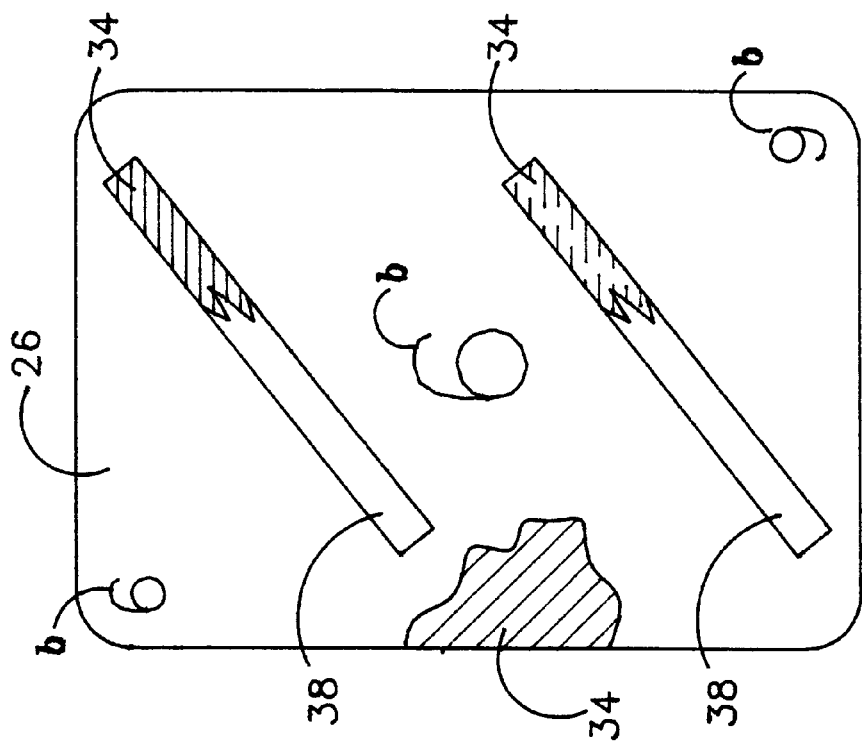
FIG. 4 is a front elevational view of another playing element utilized in the game shown in FIG. 1.
Figure 3:
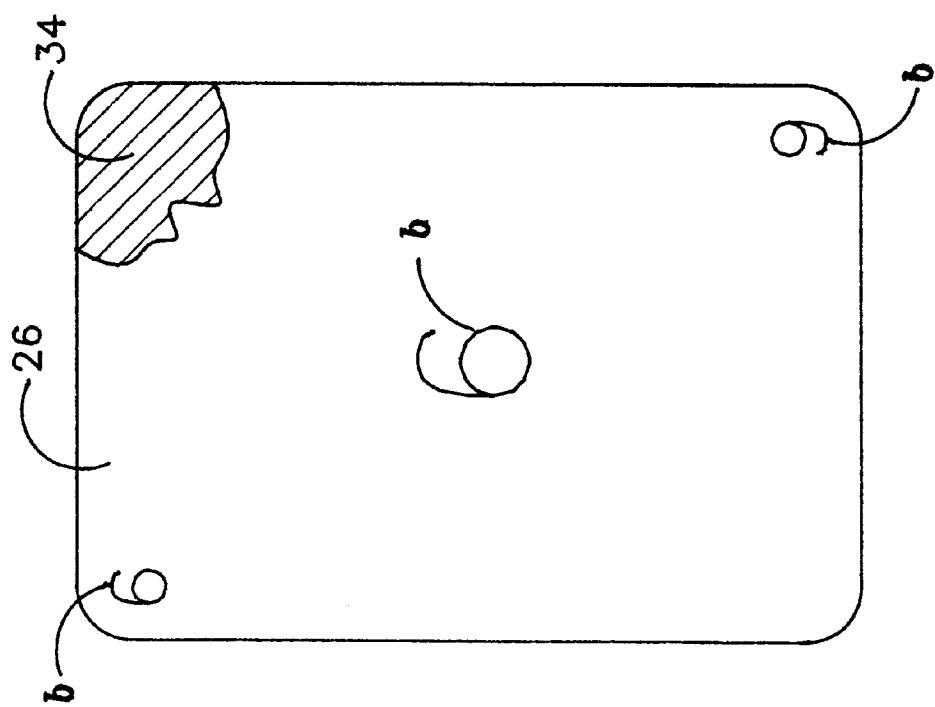
FIG. 3 is a front elevational view of a playing element utilized in the game shown in FIG. 1.
Figure 6:
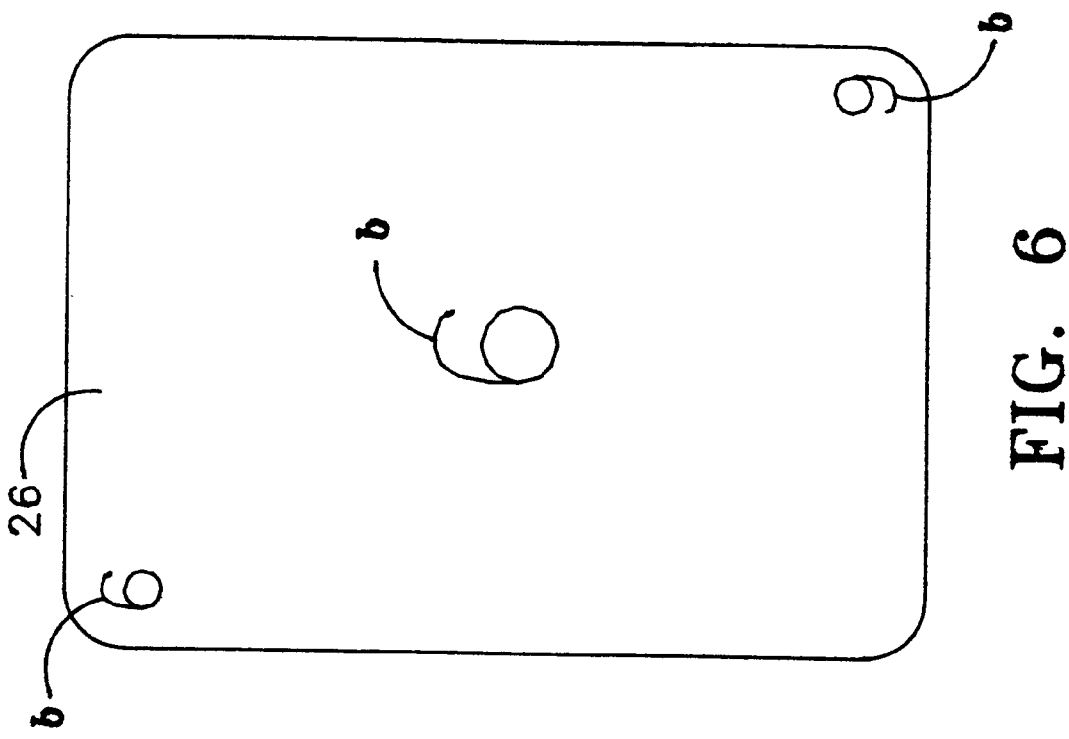
FIG. 6 a front elevational view of another playing element utilized in the game shown in FIG. 1.

FIGS. 3, 4, and 6, respectively show a card 26 from the first deck of cards, the second deck of cards, and the third deck of cards. As shown in FIGS. 1 and 3, each card 26 in the first deck of cards has a number b disposed thereon and an indicia disposed thereon. For example, the card 26 shown in FIG. 3 has the number "6" and a color 34 disposed thereon. Note that only a portion of each card 26 is shown having a color 34 disposed thereon for clarity of description.

The color 34 disposed on each card 26 aids a player 12 who is less advanced in understanding mathematical relationships successfully play game 10 in the following manner. Each card 26 bears a number b (e.g. the number "6") that is a "mathematical multiple" of the number a disposed on one of the playing locations 22. What is meant herein by the phrase "mathematical multiple" is a first whole integer that is the multiplication product of the number a disposed on the playing location 22 and a second whole integer (e.g. in FIG. 1 see numbers c shown in phantom on the playing location 22 bearing the number "6") when the number a disposed on the playing location 22 is multiplied by the second whole integer, i.e. (number a disposed on the playing location 22)×(the second whole integer)=(mathematical multiple of the number a disposed the playing location 22). For example, one playing location 22 has the number "6" disposed thereon as shown in FIG. 1, thus it should be understood that the "mathematical multiples" of the number "6" include the numbers "6" (since 1×6=6), "12" (since 2×6=12), "18" (since 3×6=18), "24" (since 4×6=24) and so forth. What is meant herein by the phrase "whole integer" is any positive or negative counting number or zero (e.g. −2, −1, 1, 2, 3, 4, 5 and so on). However, it is preferable that game 10 be played with positive counting numbers and excludes the number "0". It should be appreciated that the phrase "whole integer" does not include fractions or decimal numbers.

Each card 26 will also bear a color 34 that matches the color 34 disposed on the aforementioned playing location 22. For example, as shown in FIG. 3, if a card 26 bears the number "6" and the color green thereon, then the playing location 22 which has the number "6" will also bear the color green thereon since the number "6" is a mathematical multiple of the number "6" (i.e. 1×6=6). Thus, it should be appreciated that the cards 26 which bear other numbers b which are mathematical multiples of the number "6" will also bear the color green thereon. For example, the cards 26 that have the numbers "12", "18", "24" and so on will also bear the color green thereon since all of the aforementioned numbers are mathematical multiples of the number "6" (i.e. 2×6=12; 3×6=18; and 4×6=24, respectively). However, the card 26 which has the number "5" disposed thereon will not bear the color green thereon since the number "5" is not a mathematical multiple of the number "6" (i.e. no whole number when multiplied by the number "6" equals the number "5"). Thus, it should be appreciated that some cards 26 will bear the color green thereon and some will not, depending upon whether or not the card 26 bears a number b which is a mathematical multiple of the number "6".

Having a color 34 disposed on the cards 26 and the playing locations 22 in the above described manner facilitates a less advanced player's 12 (e.g. a younger player 12) ability to correctly place a card 26 on the appropriate playing location 22. In particular, what is meant by placing a card 26 on an appropriate playing location 22 is placing a card 26 which bears a number b on a playing location 22 such that the number b is a mathematical multiple of the number a disposed on the playing location 22. Thus, it should be appreciated that until a less advanced player 12 begins to grasp and understand the above described mathematical multiple relationship the less advanced player 12 can still play game 10 by matching colors 34. However, after a period of time, matching colors 34 in the above described manner will help the less advanced player 12 grasp and understand the mathematical multiple relationship on which game 10 is based, and thus be able to play game 10 by recognizing the appropriate mathematical relationship rather than the color relationship. Therefore, as will be discussed in greater detail below, the method of playing game 10 helps the players 12 to learn their multiplication tables.

Figure 5:
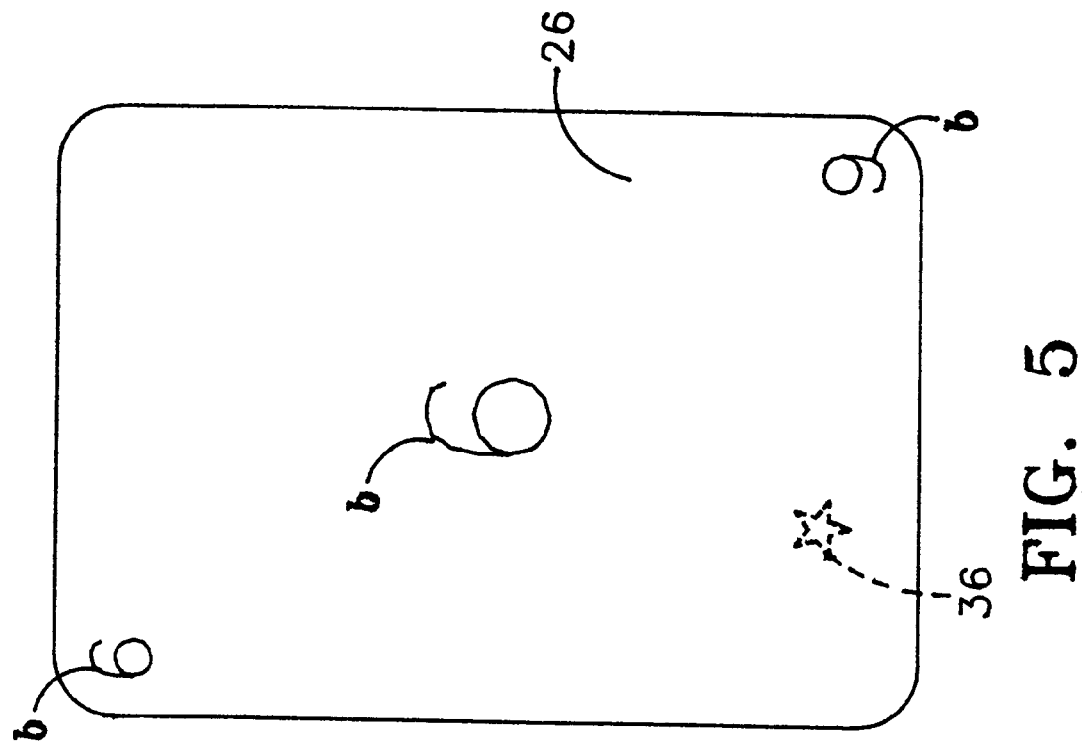
FIG. 5 is a front elevational view of yet another playing element utilized in the game shown in FIG. 1.

It should also be understood that, as previously described, indicia other than color can be utilized. For example, as shown in FIG. 5, a design such as an outline of a star 36 can be utilized on the card 26 which has the number "6" disposed thereon. Designs are used on cards 26 in the same way as colors 34. Specifically, each card 26 that bears a number b that is a mathematical multiple of the number a disposed on a playing location 22 will also bear a design that matches the design disposed on the aforementioned playing location 22. For example, as shown in FIG. 5, if a card 26 bears the number "6" and an outline of a star 36 thereon, then the playing location 22 which has the number "6" will also bear an outline of a star 36 since the number "6" is a mathematical multiple of the number "6" (i.e. 1×6=6). Thus, it should be appreciated that the cards 26 which bear other numbers b which are mathematical multiples of the number "6" will also bear an outline of a star 36. For example, the cards 26 that have the numbers "12", "18", "24" and so on will also bear the outline of a star 36 thereon since all of the aforementioned numbers are mathematical multiples of the number "6" (i.e. 2×6=12; 3×6=18; and 4×6=24, respectively). However, the card 26 which has the number "5" disposed thereon will not bear an outline of a star 36 since the number "5" is not a mathematical multiple of the number "6" (i.e. no whole number when multiplied by the number "6" equals the number "5"). Thus, it should be appreciated that some cards 26 will bear an outline of a star 36 and some will not, depending upon whether or not the card 26 bears a number b which is a mathematical multiple of the number "6".

However, it should also be understood that, in a manner similar to that described above in reference to the colors 34, each card 26 that does not bear an outline of a star 36 will have disposed thereon another type of design. The type of design each of these cards 26 bear depends upon the same mathematical multiple relationship described above with respect to the number "6". For example, if a card 26 bears the number "5" and an outline of a half moon (not shown) thereon, then the playing location 22 which has the number "5" will also bear an outline of a half moon thereon since the number "5" is a mathematical multiple of the number "5" (i.e. 1×5=5). Thus, it should be appreciated that the cards 26 which bear other numbers b which are mathematical multiples of the number "5" will also bear an outline of a half moon thereon. For example, the cards 26 that have the numbers "10", "15", "20" and so on will also bear the outline of a half moon thereon since all of the aforementioned numbers are mathematical multiples of the number "5" (i.e. 2×5=10; 3×5=15; and 4×5=20, respectively).

As shown in FIG. 4, the cards 26 that make up the second deck have an color 34 and a number of stripes 38 disposed thereon (note that only one card 26 from the second deck is shown in FIG. 4; moreover indicia other than colors 34 and stripes 38 (e.g. designs) can be used as discussed above). Each stripe 38 has a color 34 disposed thereon which is different from the color 34 disposed on card 26 and different from the other stripe 38. For example, the card 26 shown in FIG. 4 has the color green disposed thereon while one stripe 38 has the color 34 gray disposed thereon and the other stripe has the color 34 blue disposed thereon.

The colors disposed on the cards of the second deck (i.e. the colors disposed on the card 26 and the stripes 38) are utilized in playing game 10 in much the same way as described above in reference to the first deck. In particular, each card 26 that bears a number b that is a mathematical multiple of more than one number a disposed on game board 16 will also bear a color 34 either on the card 26 itself, or on one of the stripes 38, that matches the color 34 disposed on the appropriate playing location 22. For example, a shown in FIG. 4, the card 26 of the second deck which bears the number "6" thereon will also bear the color 34 green, in addition this card will have disposed thereon two stripes 38 one stripe bearing the color 34 gray and the other bearing the color 34 blue. The aforementioned card 26 has the color 34 green disposed thereon because the playing location 22 bearing the number "6" also has the color 34 green disposed thereon and the number "6" is a mathematical multiple of itself (i.e. 1×6=6). The one stripe 38 of the aforementioned card 26 bears the color 34 gray because the playing location 22 bearing the number "2" also has the color 34 gray disposed thereon and the number "6" is a mathematical multiple of the number "2" (i.e. 3×2=6). The other stripe 38 of the aforementioned card 26 bears the color 34 blue because the playing location 22 bearing the number "3" also has the color 34 blue disposed thereon and the number "6" is a mathematical multiple of the number "3" (i.e. 2×3=6).

Thus, it should be appreciated that cards 26 contained within the second deck are preferably used by players 12 which are relatively advanced mathematically as compared to players 12 that used the first deck. This is true since the use of the second deck requires the player 12 to understand that the number b disposed on a card 26 which also bears stripes 38 is a mathematical multiple of more than one number a disposed on game board 16. For example, if a player 12 playing game 10 with the second deck draws the card 26 having the number "6" disposed thereon, the player 12 must realize that the three colors 34 disposed on this card 26 (one color 34 on the card 26 and one color 34 on each stripe 38) means that this card 26 can be appropriately played on any one of three playing locations 22, i.e. the playing location 22 bearing the number "6", "3", or "2".

This is in contrast to playing the game 10 with the first deck of cards 26 which only gives the player 12 one option as to where the card 26 must be played. In particular, the card 26 from the first deck which bears the number "6" only has one color 34 disposed thereon, and thus can only be played on the one playing location 22 which bears the matching color 34. Thus, it should be appreciated that playing game 10 with the second deck, which gives the player 12 several options as to where to play the card 26, is relatively complex as compared to playing the game 10 with the first deck which gives the player 12 only one option as to where to play the card 26. However, the colors 34 disposed on the cards 26 of the second deck still facilitates a player's 12 (e.g. a younger player 12) ability to correctly place a card 26 on the appropriate playing location 22.

As shown in FIG. 6, the cards 26 that makeup the third deck only have a number b disposed thereon. In other words, these cards 26 do not have any indicia disposed thereon. In particular, the background of the card 26 on which the number b is disposed is plain white. When these cards 26 are used the player 12 must recognize which playing location 22 the card 26 should be placed without the aid of any indicia (e.g. color). For example, if the third deck is being used to play game 10 and the card 26 bearing the number "6" is drawn (see FIG. 6), the player 12 must recognize that this card can be played on any one of the three playing locations 22 bearing the numbers "6", "3", or "2" as discussed above without the aid of an indicia, such as color. Therefore, it should be appreciated that the third deck requires that the player 12 place the card 26 on the appropriate location based solely on the mathematical relationship between the number b on the card 26 and the number a on the playing location 22 (i.e. the number b on the card 26 being a mathematical multiple of the number a on the playing location 22). Therefore, it should be understood that the cards 26 from the third deck are preferably utilized when the most advanced players are playing game 10.

Game 10 is played in the following manner. Initially, as discussed above, either the first deck, the second deck, or the third deck is chosen to play game 10 depending upon mathematical proficiency of the players 12. Once the appropriate deck is chosen, the multiplicity of cards 26 contained within the deck are shuffled. Ten cards 26 are then dealt to each player 12 when two or three players 12 are playing game 10. Eight cards 26 are dealt to each player 12 when four or more players 12 are playing game 10. The remaining cards 26 are left in the deck and used as a draw pile 42 (see FIG. 1). One player is designated to start game 10 and draws one card 26 from the draw pile 42. Once the aforementioned card 26 is drawn, the player 12 tries to play as many cards from his or her hand as possible. In particular, the player 12 tries to remove from his or her hand cards 26 which bear a number b that is a mathematical multiple of the number a disposed on one of the playing locations 22. The player 12 then places these cards 26 on the appropriate playing location 22 such that the number b disposed on the card 26 is a mathematical multiple of the number a disposed on the playing location 22. In addition, it is preferable that the player 12 must place the cards 26 on the appropriate playing location 22 in numerical sequence starting with the lowest mathematical multiple and proceeding sequentially to higher mathematical multiples. For example, the player 12 must first place the card 26 bearing the number "6" on the playing location 22 having the number "6" disposed thereon since the number "6" is the lowest mathematical multiple of the number "6", i.e. 1×6=6. The next card 26 placed on the playing location 22 bearing the number "6" must be the card 26 bearing the number "12" since the next highest mathematical multiple of the number "6" is the number "12", i.e. 2×6=12. The next card which must be placed on the playing location 22 bearing the number "6" must be the card bearing the number "18" since the next highest mathematical multiple of the number "6" after the number "12" is the number "18", i.e. 3×6=18, and so on. The above described relationship between the numerical sequence can be mathematically expressed as follows:

X is a number a indicated on the playing location 22 on which the initial card 26 is positioned; N is a whole integer which when multiplied by X equals the number b indicated on the initial card; Y is the number b indicated on the initial card 26 placed on the aforementioned playing location 22 (i.e. Y is the first mathematical multiple of X); Z is the number b indicated on the card 26 which is placed on the aforementioned initial card 26 (i.e. Z is the second mathematical multiple of X); Q is the number b indicated on the card 26 which is placed on the aforementioned card 26 bearing the second mathematical multiple (i.e. Q is the third mathematical multiple of the X); N·X=Y; (N+1)·X=Z; and (N+2)·X=Q.

Thus, it should be understood that the player 12 is not allowed to place cards 26 on any playing location 22 which are out of sequence. For example, a player 12 would not be allowed to place the card 26 bearing the number "6" on the playing location 22 having the number "6" disposed thereon, and then follow up by placing the card 26 bearing the number "18" on the same playing location 22 since the number "18" is not the next highest mathematical multiple of the number "6". When the player 12 can no longer play any cards 26 from his or her hand (i.e. no cards 26 in his or her hand are the next highest mathematical multiple of any of the number a disposed on any of the playing locations 22), the player 12 ends his or her turn by passing a card 26 face down to the player 12 to his or her left. The player 12 who receives this card 26 then resumes play as described above. The game 10 ends when a player 12 places all of his or her cards 26 on the playing locations 22 and is declared the winner.

FIG. 1 depicts game 10 being played by two players 12 with the first deck of cards 26. In particular, one player 12 was dealt a multiplicity of cards 26 having the numbers "16", "32", "35", "14", "28", "27", "6", "12", "18", and "24" disposed thereon (hereinafter referred to as the first player 12). The other player 12 was also dealt a multiplicity of cards 26 having the numbers "63", "56", "42", "49", "70", "25", "40", "5", "10", and "15" disposed thereon (hereinafter referred to as the second player 12). The playing of game 10 is initiated by the first player 12 drawing a card 26 from draw pile 42. For example, the first player 12 may draw a card 26 from draw pile 42 having the number "64" disposed thereon as shown in FIG. 1.

Once the first player 12 draws the card 26 from the draw pile 42 the first player 12 determines if the number b indicated on any one of the cards 26 is a first mathematical multiple (e.g. lowest mathematical multiple) of any number a indicated on any one of playing locations 22. For example, the first player 12 has the card 26 bearing the number "6" thereon, and the number "6" is the first mathematical multiple of the number "6" since 1×6=6. Therefore, the first player 12 removes this card 26 from his or her multiplicity of cards and places the card 26 bearing the number "6" on the playing location 22 having the number "6" disposed thereon as shown in FIG. 1. It should be appreciated that by using the first deck of cards 26, the color 34 disposed on the cards 26 will aid the first player 12 in placing the cards 26 on the appropriate playing locations 22 (i.e. the color 34 disposed on the card 26 will match the color 34 disposed on the appropriate playing location 22 as previously discussed). The first player 12 also has the card 26 having the number "12" disposed thereon, and the number "12" is the second mathematical multiple or the next highest mathematical multiple of the number "6" since 2×6=12. Therefore, the first player 12 also places the card 26 bearing the number "12" on the card 26 bearing the number "6" thereon. Note that by placing the card 26 bearing the number "12" on the card 26 bearing the number "6" the card 26 bearing the number "12" is also placed on playing location 22 having the number "6" disposed thereon. The first player 12 also has the card 26 having the number "18" disposed thereon, and the number "18" is the third mathematical multiple of the number "6" since 3×6=18. Thus, the first player 12 places the card 26 bearing the number "18" on the card 26 bearing the number "12" thereon. In addition, the first player 12 has the card 26 having the number "24" disposed thereon, and the number "24" is the forth mathematical multiple of the number "6" since 4×6=24. Thus, the first player 12 places the card 26 bearing the number "24" on the card 26 bearing the number "18". Note that by placing the cards 26 in the above described manner the mathematical multiples of the number "6" are positioned in sequence from the first mathematical multiple to the fourth mathematical multiple, i.e. from the lowest mathematical of the number "6", which is the number "6", to the fourth mathematical multiple of the number "6", which is the number "24". In addition, note that placing cards 26 in the above described manner results in each card 26 bearing a number b that is a mathematical multiple of the number "6" indicated on the playing location 22.

Once the first player 12 places the aforementioned cards 26 in the above described manner the first player's 12 turn is over since the cards 26 remaining in the first player's hand do not bear a number b which is a mathematical multiple in the correct sequence of any of the numbers a disposed on playing locations 22. For example, the card 26 bearing the number "16" is a mathematical multiple of the number "4" (i.e. 4×4=16) and thus could, at some point in the game, be played on the playing location 22 having the number "4" disposed thereon. However, the number "16" is not the first mathematical multiple of the number "4", and thus can not be placed on the playing location 22 bearing the number "4" until the series of cards 26 bearing the numbers "4", "8", and "12" have been placed on the playing location 22 bearing the number "4". These, above described "mathematical playing restrictions", i.e. only playing cards 26 in above discussed mathematical sequence, also apply to the remaining cards 26 held by the first player 12. For example, the card 26 bearing the number "32" can be placed on the playing location 22 bearing the number "8" at some point in playing game 10, but not until the series of cards 26 bearing the numbers "8", "16", and "24" have been placed on the playing location 22 bearing the number "8". When the first player 12 can no longer play a card 26, the first player 12 removes a card 26 from his or her multiplicity of cards 26 and then passes this card 26 to the player 12 to his or her left in a manner such that no other player 12 can see the number b on the card 26 being passed. This passing of the card 26 ends the first player's 12 turn.

Once the first player's 12 turn is over, the second player 12 takes his or her turn. The second player's 12 turn is conducted in a substantially identical manner as that described for the first player's 12 turn. Specifically, the second player 12 draws a card 26 from the draw pile 42. The second player 12 then determines if the number b indicated on any one of the cards 26 in his or her multiplicity of cards 26 is a first mathematical multiple (e.g. lowest mathematical multiple) of any number a indicated on any one of playing locations 22. For example, the second player 12 has the card 26 bearing the number "5" thereon, and the number "5" is the first mathematical multiple of the number "5" since 1×5=5. Therefore, the second player 12 removes this card 26 from his or her multiplicity of cards 26 and places the card 26 bearing the number "5" on the playing location 22 having the number "5" disposed thereon as shown in FIG. 1. The second player 12 also has the card 26 having the number "10" disposed thereon, and the number "10" is the second mathematical multiple or the next highest mathematical multiple of the number "5" since 2×5=10. Therefore, the second player 12 also places the card 26 bearing the number "10" on the card 26 bearing the number "5" thereon. The second player 12 also has the card 26 having the number "15" disposed thereon, and the number "15" is the third mathematical multiple of the number "5" since 3×5=15.

Thus, the second player 12 places the card 26 bearing the number "15" on the card 26 bearing the number "10" thereon.

It should be understood that the second player 12 could also add to the sequence of cards 26 placed on the playing location 22 which bears the number "6" if the second player 12 had the appropriate card 26. Specifically, if the second player had the card 26 having the number "30" disposed thereon then he or she could place that card 26 on the card 26 bearing the number "24". The same holds true for the first player 12 when it is his or her turn again. In addition, it should be understood that the second player 12 can also place cards on more than one playing location 22 during his or her turn. For example, if the second player 12 had the card bearing the number "5" and the card 26 bearing the number "9" the second player 12 could play both cards 26 in a single turn by placing the card bearing the number "5" on the playing location 22 having the number "5" disposed thereon and placing the card bearing the number "9" on the playing location 22 having the number "9" disposed thereon.

The first player 12 and the second player 12 continue taking turns playing game 10 in the above described manner until one player 12 gets rid of all of his or her cards by placing the cards 26 on game board 16 in the above described manner. The player 12 who gets rid of all of his or her cards 26 in the above described manner is declared the winner.

Game 10 is played in a substantially identical way with the cards 26 from the second deck and the third deck with the exception that (i) the cards 26 from the second deck have several indicia thereon (e.g. several colors) such that the player 12 is given several options as to which playing location 22 to place the card 26 thereon and (ii) the cards from the third deck have no indicia thereon so the player 12 must decide which playing location 22 to place the card 26 thereon solely based upon the mathematical relationship between the number b on the card 26 and the number a on the playing location 22. However, regardless of whether game 10 is played with the first deck, the second deck, or the third deck playing game 10 in the above described manner facilitates players 12 learning their multiplication tables.

Referring now to FIG. 2, there is shown game board 16 being used to teach players 12 their division tables as opposed to their multiplication tables as described above. In particular, when game 10 is utilized to teach the division tables, game 10 is used in substantially the same way as described above in reference to the multiplication tables with the exception that a card 26 is placed on a playing location 22 such that the number b disposed on the card is a "mathematical quotient" of the number a disposed the playing location 22. What is meant herein by the phrase "mathematical quotient" is a first whole integer that is the division quotient of the number a disposed on the playing location 22 and a second whole integer (e.g. in FIG. 2 see numbers c shown in phantom on the playing location 22 bearing the number "6") when the number a is divided by the second whole integer, i.e. (number a disposed on the playing location 22)÷(the second whole integer)=(mathematical quotient of the number a disposed the playing location 22). For example, one playing location 22 has the number "6" disposed thereon as shown in FIG. 2, thus it should be understood that the "division quotient" of the number "6" include the numbers "6" (since 6÷1=6), "3" (since 6÷2=3), and "2" (since 6÷3=2).

It should be understood that a similar first deck, second deck, and third deck, of cards 26 are used to play game 10 when teaching division tables as when teaching multiplication tables. In particular, the first deck of cards 26 has a single indicia disposed on each card 26 thereof such that the indicia will aid a player 12 in placing a card 26 on the appropriate playing location 22. The second deck of cards 26 has several indicia disposed on each card 26 thereof such that each indicia will aid a player 12 in placing a card 26 on the appropriate playing location 22. The third deck of cards 26 has no indicia disposed on any of the cards 26 such that the player 12 must decide which playing location 22 to place the card 26 based solely on the mathematical relationship between the number b disposed on the card 26 and the number a disposed on the playing location 22.

In addition, when game 10 is played to so as to teach the players 12 their division tables, it is preferable that the player 12 must place the cards 26 on the appropriate playing location 22 in numerical sequence starting with the highest mathematical quotient and proceeding sequentially to lower mathematical quotients. For example, the player 12 must first place the card 26 bearing the number "6" on the playing location 22 having the number "6" disposed thereon since the number "6" is the highest mathematical quotient of the number "6", i.e. 6÷1=6. The next card 26 placed on the playing location 22 bearing the number "6" must be the card 26 bearing the number "3" since the next lower mathematical quotient of the number "6" is the number "3", i.e. 6÷2=3. The next card which must be placed on the playing location 22 bearing the number "6" must be the card bearing the number "2" since the next lower mathematical quotient of the number "6" after the number "3" is the number "2", i.e. 6÷3=2. The above described relationship between the numerical sequence can be mathematically expressed as follows:

X is a number a indicated on the playing location 22 on which the initial card 26 is positioned; N is a whole integer which when divided into X equals the number b indicated on the initial card 26; Y is the number b indicated on the initial card 26 placed on the aforementioned playing location 22 (i.e. Y is the first mathematical quotient of X); Z is the number b indicated on the card 26 which is placed on the aforementioned initial card 26 (i.e. Z is the second mathematical quotient of X); Q is the number b indicated on the card 26 which is placed on the aforementioned card 26 bearing the second mathematical quotient (i.e. Q is the third mathematical quotient of the number X); X÷N=Y; X÷(N+1)=Z; and X÷(N+2)=Q.

As previously mentioned, FIG. 2 depicts game 10 being played so as to learn the division tables. The game 10 is being played by two players 12 with the first deck of cards 26. In particular, one player 12 was dealt a multiplicity of cards 26. One of these cards has the number "6" disposed thereon, one has the number "3" disposed thereon, and one has the number "2" disposed thereon. The player 12 having the aforementioned cards is hereinafter referred to as the first player 12. The other player 12 was also dealt a multiplicity of cards 26. One of these cards has the number "9" disposed thereon and one has the number "3" disposed thereon. Note that the rest of the multiplicity of cards dealt to the first player and the second player are not shown in FIG. 2. The player 12 having these cards is hereinafter referred to as the second player 12.

The playing of game 10 is initiated by the first player 12 drawing a card 26 from draw pile 42. Once the first player 12 draws the card 26 from the draw pile 42 the first player 12 determines if the number b indicated on any one of the cards 26 is a first mathematical quotient (i.e. highest mathematical quotient) of any number a indicated on any one of playing locations 22. For example, the first player 12 has the card 26 bearing the number "6" thereon, and the number "6" is the first mathematical quotient of the number "6" since 6÷1=6. Therefore, the first player 12 removes this card 26 from his or her multiplicity of cards and places the card 26 bearing the number "6" on the playing location 22 having the number "6" disposed thereon as shown in FIG. 2. It should be appreciated that by using the first deck of cards 26, the color 34 disposed on the cards 26 will aid the first player 12 in placing the cards 26 on the appropriate playing locations 22 (i.e. the color 34 disposed on the card 26 will match the color 34 disposed on the appropriate playing location 22 as previously discussed). The first player 12 also has the card 26 having the number "3" disposed thereon, and the number "3" is the second mathematical quotient or the next mathematical quotient of the number "6" since 6÷2=3. Therefore, the first player 12 also places the card 26 bearing the number "3" on the card 26 bearing the number "6" thereon. Note that by placing the card 26 bearing the number "3" on the card 26 bearing the number "6" the card 26 bearing the number "3" is also placed on playing location 22 having the number "6" disposed thereon. The first player 12 also has the card 26 having the number "2" disposed thereon, and the number "2" is the third mathematical multiple of the number "6" since 6÷3=2. Thus, the first player 12 places the card 26 bearing the number "2" on the card 26 bearing the number "3" thereon. Note that by placing the cards 26 in the above described manner the mathematical quotients of the number "6" are positioned in sequence from the first mathematical quotient to the third mathematical quotient. In addition, note that placing cards 26 in the above described manner results in each number b disposed on a card 26 placed on the playing location 22 is a mathematical quotient of the number "6" indicated on the playing location 22.

Once the first player 12 places the aforementioned cards 26 in the above described manner the first player's 12 turn is over since the cards 26 remaining in the first player's hand do not bear a number b which is a mathematical quotient in the correct sequence of any of the numbers a disposed on playing locations 22. At this point, the first player 12 removes a card 26 from his or her multiplicity of cards 26 and then passes this card 26 to the player 12 to his or her left in a manner such that no other player 12 can see the number b on the card 26 being passed. This passing of the card 26 ends the first player's 12 turn.

Once the first player's 12 turn is over, the second player 12 takes his or her turn. The second player's 12 turn is conducted in a substantially identical manner as that described for the first player's 12 turn. Specifically, the second player 12 draws a card 26 from the draw pile 42. The second player 12 then determines if the number b indicated on any one of the cards 26 in his or her multiplicity of cards 26 is a first mathematical quotient of any number a indicated on any one of playing locations 22. For example, the second player 12 has the card 26 bearing the number "9" thereon, and the number "9" is the first mathematical quotient of the number "9" since 9÷1=9. Therefore, the second player 12 removes this card 26 from his or her multiplicity of cards 26 and places the card 26 bearing the number "9" on the playing location 22 having the number "9" disposed thereon as shown in FIG. 2. The second player 12 also has the card 26 having the number "3" disposed thereon, and the number "3" is the second mathematical quotient of the number "9" since 9÷3=3. Therefore, the second player 12 also places the card 26 bearing the number "3" on the card 26 bearing the number "9" thereon.

Once the second player 12 places the aforementioned cards 26 in the above described manner the second players 12 turn is over since the cards 26 remaining in the second player's hand do not bear a number b which is a mathematical quotient in the correct sequence of any of the numbers a disposed on playing locations 22. At this point, the second player 12 removes a card 26 from his or her multiplicity of cards 26 and then passes this card 26 to the player 12 to his or her left in a manner such that no other player 12 can see the number b on the card 26 being passed. This passing of the card 26 ends the second player's 12 turn.

The first player 12 and the second player 12 continue taking turns playing game 10 in the above described manner until one player 12 gets rid of all of his or her cards by placing the cards 26 on game board 16 in the above described manner. The player 12 who gets rid of all of his or her cards 26 in the above described manner is declared the winner.

Thus it should be appreciated that game 10 provides a method of playing an educational mathematical game which is (i) fun and entertaining to a child, (ii) introduces a competitive element into learning basic mathematical skills and (iii) can be utilized to teach mathematical skills to relatively advanced children and children which are not as advanced.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected. For example, while the game 10 is described above as being played on game board 16, it should also be understood that game 10 can be played with a computer such that the game area 14 is defined on a computer screen (not shown).

What is claimed is:

1. A method of playing a game with a number of players, comprising the steps of:

(a) providing a game playing area which has (i) a plurality of playing locations thereon and (ii) a number indicated on each of said playing locations;

(b) providing a plurality of playing elements, each playing element having a number indicated thereon;

(c) determining if said number indicated on any one of said plurality of said playing elements is a first mathematical multiple of said number indicated on any one of said playing locations;

(d) removing from said plurality of playing elements a first playing element that has said number indicated thereon which is said first mathematical multiple of said number indicated on one of said playing locations;

(e) positioning said first playing element on one of said playing locations such that said number indicated on said first playing element is said first mathematical multiple of said number indicated on said playing location on which said first playing element is positioned;

(f) determining if said number indicated on any one of said plurality of said playing elements is a second mathematical multiple of said number indicated on said playing location on which said first playing element is positioned;

(g) removing from said plurality of playing elements a second playing element that has said number indicated thereon which is said second mathematical multiple of said number indicated on said playing location on which said first playing element is positioned; and (h) positioning said second playing element on said playing location on which said first playing element is positioned.

2. The method of claim 1, wherein:

X is said number indicated on said playing location on which said first playing element is positioned, N is an integer which when multiplied by X equals said number indicated on said first playing element, Y is said number indicated on said first playing element, Z is said number indicated on said second playing element, N·X=Y, and (N+1)·X=Z.

3. The method of claim 1, wherein:

said first playing element has a first indicia thereon, said playing location on which said first playing element is positioned has a second indicia thereon, and said first indicia matches said second indicia.

4. The method of claim 3, wherein:

said first indicia is a color, and said second indicia is said color.

5. The method of claim 1, wherein:

said game playing area is defined by a game board, and said plurality of playing elements are cards.

6. The method of claim 5, wherein:

said game board is divided into a plurality of sections and each section defines one of said playing locations.

7. A method of playing a game with a number of players, comprising the steps of:

(a) providing a game playing area which has (i) a plurality of playing locations thereon and (ii) a number indicated on each of said playing locations;

(b) providing a plurality of playing elements, each playing element having a number indicated thereon;

(c) determining if said number indicated on any one of said plurality of said playing elements is a first mathematical quotient of said number indicated on any one of said playing locations;

(d) removing from said plurality of playing elements a first playing element that has said number indicated thereon which is said first mathematical quotient of said number indicated on one of said playing locations;

(e) positioning said first playing element on one of said playing locations such that said number indicated on said first playing element is said first mathematical quotient of said number indicated on said playing location on which said first playing element is positioned;

(f) determining if said number indicated on any one of said plurality of said playing elements is a second mathematical quotient of said number indicated on said playing location on which said first playing element is positioned;

(g) removing from said plurality of playing elements a second playing element that has said number indicated thereon which is said second mathematical quotient of said number indicated on said playing location on which said first playing element is positioned; and (h) positioning said second playing element on said playing location on which said first playing element is positioned.

8. The method of claim 7, wherein:

X is said number indicated on said playing location on which said first playing element is positioned, N is an integer which when divided into X equals said number indicated on said first playing element, Y is said number indicated on said first playing element, Z is said number indicated on said second playing element, X÷N=Y, and

X÷(N+1)=Z.

9. The method of claim 7, wherein:

said first playing element has a first indicia thereon, said playing location on which said first playing element is positioned has a second indicia thereon, and said first indicia matches said second indicia.

10. The method of claim 9, wherein:

said first indicia is a color, and said second indicia is said color.

11. The method of claim 7, wherein:

said game playing area is defined by a game board, and said plurality of playing elements are cards.

12. The method of claim 11, wherein:

said game board is divided into a plurality of sections, and each section defines one of said playing locations.

13. A method of playing a game, said game including (i) a game board which is divided into a plurality of sections such that each of said sections defines a playing location, (ii) a number disposed on each of said playing locations, (iii) a plurality of cards, and (iv) a number disposed on each of said cards, comprising the steps of:

(a) providing a game player with a multiplicity of said cards;

(b) said game player determining if said number indicated on any one of said cards is a first mathematical multiple of said number indicated on any one of said playing locations;

(d) removing from said multiplicity of said cards a first card that has said number indicated thereon which is said first mathematical multiple of said number indicated on one of said playing locations;

(e) positioning said first card on one of said playing locations such that said number indicated on said first card is said first mathematical multiple of said number indicated on said playing location on which said first card is positioned;

(f) said game player determining if said number indicated on any one of said cards is a second mathematical multiple of said number indicated on any one of said playing locations;

(g) removing from said multiplicity of said cards a second card that has said number indicated thereon which is said second mathematical multiple of said number indicated on one of said playing locations; and (h) positioning said second playing element on said playing location on which said first playing element is positioned, wherein X is said number indicated on said playing location on which said first card is positioned, N is an integer which when multiplied by X equals said number indicated on said first card, Y is said number indicated on said first card, Z is said number indicated on said second card, N·X=Y, and (N+1)·X=Z.

14. A method of playing a game, said game including (i) a game board which is divided into a plurality of sections such that each of said sections defines a playing location, (ii) a number disposed on each of said playing locations, (iii) a plurality of cards, and (iv) a number disposed on each of said cards, comprising the steps of:

(a) providing a game player with a multiplicity of said cards;

(b) said game player determining if said number indicated on any one of said cards is a first mathematical multiple of said number indicated on any one of said playing locations;

(d) removing from said multiplicity of said cards a first card that has said number indicated thereon which is said first mathematical multiple of said number indicated on one of said playing locations; and (e) positioning said first card on one of said playing locations such that said number indicated on said first card is said first mathematical multiple of said number indicated on said playing location on which said first card is positioned, (f) said game player determining if said number indicated on any one of said cards is a second mathematical multiple of said number indicated on any one of said playing locations;

(g) removing from said multiplicity of said cards a second card that has said number indicated thereon which is said second mathematical multiple of said number indicated on one of said playing locations; and (h) positioning said second playing element on said playing location on which said first playing element is positioned, wherein said first playing element has a first indicia thereon, said playing location on which said first playing element is positioned has a second indicia thereon, and said first indicia matches said second indicia.

15. The method of claim 14, wherein:

said first indicia is a color, and said second indicia is said color.

16. The method of claim 14, wherein:

said first indicia is a design, and said second indicia is said design.

\* \* \* \* \*